United States Patent [19]

Takada

[11] 4,411,448
[45] Oct. 25, 1983

[54] PASSIVE TYPE VEHICLE OCCUPANT RESTRAINT BELT SYSTEM WITH ELECTRICAL BRAKING

[76] Inventor: Juichiro Takada, 3-12-1, Shinmachi, Setagayaku, Tokyo, Japan

[21] Appl. No.: 274,533

[22] Filed: Jun. 17, 1981

[51] Int. Cl.³ .............................................. B60R 21/10
[52] U.S. Cl. .................................. 280/802; 180/268; 297/469; 307/10 SB
[58] Field of Search ............... 280/802, 804; 180/268, 180/270; 297/469; 307/10 SB

[56] References Cited

U.S. PATENT DOCUMENTS 3,748,640  7/1973  Sardo .................................. 180/270
3,831,140  8/1974  Anderson ........................ 307/10 SB

FOREIGN PATENT DOCUMENTS 2220202  11/1973  Fed. Rep. of Germany ...... 180/268

*Primary Examiner*—Bruce H. Stoner, Jr.
*Assistant Examiner*—John A. Carroll
*Attorney, Agent, or Firm*—Brumbaugh, Graves, Donohue & Raymond

[57] ABSTRACT

A belt transfer system for a passive vehicle occupant restraint belt system comprises a DC power source, a reversible DC motor and circuits for connecting the motor across to the power source for reversible operation and for braking the motor at the end of each operation by connecting both sides of the motor armature to the power source.

4 Claims, 6 Drawing Figures

PASSIVE TYPE VEHICLE OCCUPANT RESTRAINT BELT SYSTEM WITH ELECTRICAL BRAKING

FIELD OF THE INVENTION

The present invention relates to a passive type vehicle occupant restraint belt system, that is, the type of occupant restraint belt system in which a lap belt, shoulder belt or both are automatically transferred between restraint and release configurations in response to opening and closing of the vehicle door.

BACKGROUND OF THE INVENTION

It is widely recognized by vehicle safety authorities that the manually operated restraint belt systems with which most motor vehicles are equipped at the present time are often not used by the vehicle occupants. Many people find it unduly troublesome to do up the belt each time they enter the vehicle and undo it when they leave. They also find the belt somewhat uncomfortable when in the restraining position. By the same token, it is also recognized that the safety belts can markedly reduce injuries and fatalities resulting from vehicle accidents.

In order to encourage the use of a safety belt system, a great deal of development effort has gone into the creation of passive type belt systems that are automatically shifted into a restraining configuration when an occupant enters a vehicle and closes the door and automatically transferred to a releasing configuration when the occupant opens the door. Many of these proposed passive systems employ one or more belt guide members that are connected to the restraint belt and are driven back and forth along a guide rail to transfer the engaged portion of the belt between a restraint location and a release location establishing the respective restraint and release configurations of the belt. For example, some types of systems involve a shoulder belt that is connected to a moving anchor that moves along a track located at the edge of the vehicle roof generally above the door. The moving anchor moves between a restraint location above and behind the outboard shoulder of the occupant and a release location at or along the front pillar. In a similar system, the outboard end of a shoulder belt is anchored above and behind the vehicle occupant and passes from the anchor through a movable guide member that moves along a track above the door. Other systems employ a moving anchor or a belt guide member that moves along a guide rail installed on the vehicle door, and there are some systems in which an inboard portion of a lap belt, shoulder belt, or control belt is moved forward and backward.

The drive mechanism for transferring the moving anchor or movable belt guide, which are hereinafter referred to collectively as a belt guide member, often is a reversible, electric motor powered by the vehicle battery and coupled to the belt guide member by a semi-flexible drive element, such as a racked wire, by means of a reduction device. The drive system for the belt guide member should fulfill a number of requirements, and not all drive systems proposed heretofore have met the requirements to the extent necessary to ensure commercial success. Among the requirements is that the device be of compact construction so that it can readily be installed in a small amount of space, such as the space within the vehicle door or within the body of the vehicle adjacent to the door frame. It is also essential that the drive device include a reliable control system to ensure that the belt system remains secured in the restraint location when the occupant is in the vehicle and the door is closed. Any mismatching of the timing or any failure of the device properly to locate the belt guide member at the restraint location can present a great risk to the occupant in the event of an accident. The drive system must also be long-lived and capable of operating reliably through thousands of cycles of operation throughout the useful life of the vehicle. Meeting the requirements of reliability and long-life necessitates minimizing shock loads on the components as the drive mechanism is started and stopped, lest repeated shock loads cause wear or breakage to one or more components of the system. This requirement ties in with the requirement for proper timing of the control of the drive system while ensuring that the restraint and release locations of the movable belt guide member are uniformly attained.

In safety belt systems it is essential that the restraint and release positions remain the same each time the system operates. If, for example, the restraint position moves too far rearwardly from the predetermined position, the belt system may uncomfortably restrain the occupant. If the belt system does not move sufficiently rearwardly, the system may not provide adequate safety protection for the occupant of the vehicle. Shifts in the release position of the belt are, of course, not as serious but can be psychologically disturbing to the occupant of the vehicle in that his confidence in the system can be diminished.

Prior systems have employed microswitches as limit switches to control the opening and closing of the contact points for the transfer members. The microswitches stop or start the operation of a reversible DC motor in response to the opening and closing of the vehicle door. The microswitches, however, suffer from a significant defect in that they do not compensate for the significant inertia of the motor generated when the belt is moving between the restraint and release configurations. Consequently, the inertia of the motor continues to move the belt system beyond the selected restraint or release position.

Braking mechanisms have been suggested to stop the rotation of the motor in prior belt systems. However, these devices have been unduly complex and, hence, have significantly increased the costs of production.

The microswitches for detecting the release and restraint positions of the belt have also been located away from the drive motor. Additional wiring connecting the microswitches with the motor is thus required, complicating the wiring of the vehicle and further increasing the costs of producing and installing the belt systems.

SUMMARY OF THE INVENTION

There is provided, in accordance with the present invention, a belt guide member transfer system which meets very well all of the requirements described above, namely, reliability over a long useful life, ease of construction and installation, relatively low manufacturing and installation costs, and the capability of quickly stopping the belt guide member at the desired locations along the guide rail. It will be apparent to those skilled in the art that the transfer system can be applied to a movable belt guide associated with any of a variety of types of passive belt systems.

The transfer system, according to the invention, includes a reversible DC electric motor that drives by means of a flexible drive wire, such as a racked wire, a belt guide member between a restraint position in which the belt is positioned to engage and restrain an occupant of the vehicle and a release position in which the belt is positioned to release the occupant.

The motor is controlled by circuits established by a total of eight switches, four of which are transferred in response to the position of the vehicle door and four of which are transferred in response to the position of the belt guide member. Preferably, and in accordance with well-known arrangements, a double-pole, double-throw door switch responds to opening and closing of the vehicle door by reversing the polarity of two motor energization circuits, one of which energizes the motor for operation in a direction to transfer the belt guide member from the release location to the restraint location when the door is closed and the other of which energizes the motor in the reverse direction to move the guide member from the restraint location to the release location when the door is opened.

The four switches that are transferred in accordance with the position of the belt guide member are, preferably, rotary switches that are driven by the motor of the belt transfer system through reduction gearing and are, therefore, indicative of the position of the belt guide member. One of those switches is normally open but closes when the belt guide member is substantially at the release location and forms a first circuit in which both sides of the armature of the motor are connected to the power source. Accordingly, when the belt guide member arrives at the release location, the first circuit provides electrical braking of the motor so that it stops quickly in the desired location along the guide rail. A second switch is normally closed whenever the belt guide member is away from the release location and completes a circuit across the motor for energization to drive the motor in a direction to move the belt guide member from the restraint to the release location. The third of the switches that respond to the position of the belt guide member completes a circuit across the motor that energizes it in a direction to move the belt guide member from the release to the restraint location and is normally closed except when the belt guide member is substantially at the restraint location, whereupon it opens to break the circuit and stop the motor. The fourth switch completes a circuit in which both sides of the armature of the motor are connected to the power source for electrical braking. Accordingly, the fourth circuit is normally open but closes when the belt guide member is substantially at the restraint location.

From the foregoing, it will be apparent that the four switches that respond to opening and closing of the door and the four switches that respond to the position of the belt guide member set up four electrical circuits, two of which energize the motor to drive the belt guide member and the other two of which "short circuit" the motor for electrical braking. The electrical braking constitutes a considerable improvement over prior proposals of ways for stopping the belt guide member at the desired restraint and release locations.

BRIEF DESCRIPTION OF THE DRAWINGS

A more complete understanding of the invention and its advantages will be apparent from the following description of exemplary embodiments, taken in conjunction with the accompanying drawings, in which.

DESCRIPTION OF EXEMPLARY EMBODIMENTS

Figure 1:
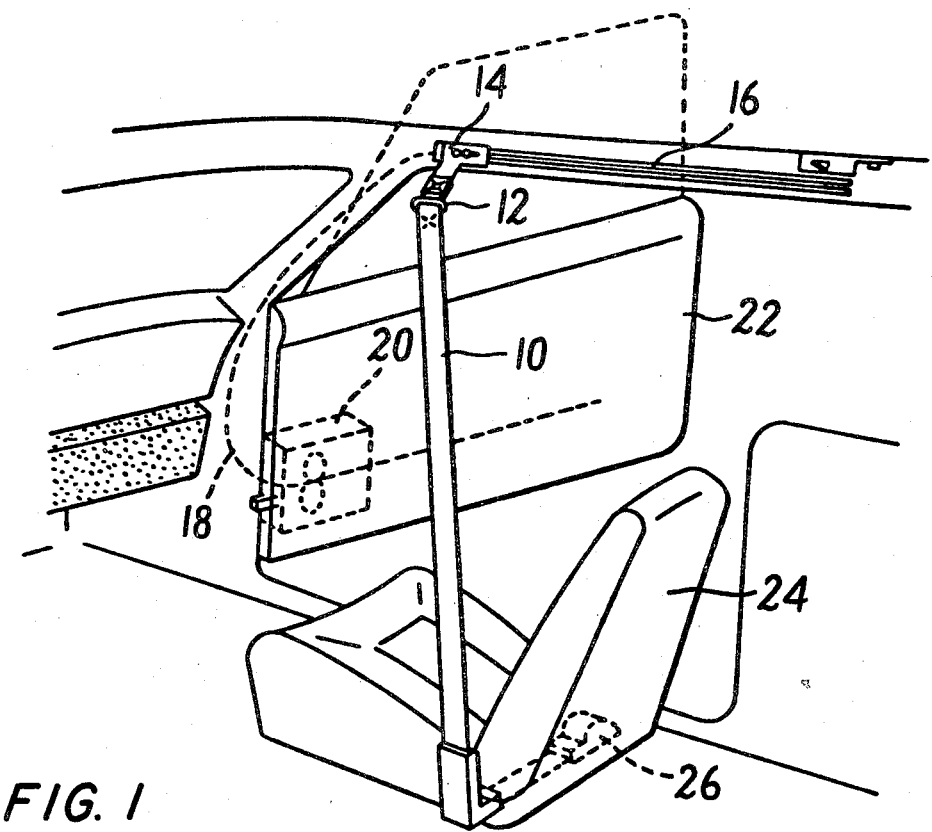
FIG. 1 is a generally schematic, pictorial view of one restraint system in which the present invention is useful.

The passive restraint belt system shown in FIG. 1 is one example of the various such systems with which the drive device embodying the present invention can be used. It comprises a continuous restraint belt 10 having one end attached by an emergency release buckle 12 to a moving anchor 14 that slies along a guide rail 16 affixed to the inside of the roof of the vehicle generally above the door 22. The moving anchor 14 is moved forward along the guide rail 16 by a transfer system that includes a racked wire 18 driven by a gear-reduced, reversible DC electric motor 20 installed in the vehicle door 22. When the vehicle door 22 is opened, the transfer system moves the moving anchor 14 to a release position at the forward end of the guide rail 16, and in the process, shifts the restraint belt 10 into a release configuration in which it lies generally away from the occupant of the seat 24. Meanwhile, the belt 10 is withdrawn from a retractor 26 located underneath the seat 24. When the vehicle door 22 is closed, the transfer system moves the moving anchor 14 to a restraint position at the rear end of the guide rail 16, thereby allowing the belt 10 automatically to assume a restraint configuration in which the belt embraces the upper body of the occupant of the seat 24. The retractor 26 provides a sufficient force to keep the belt 10 lying generally against the occupant, thus insuring that the belt 10 is in the restraining configuration, but permits adjustment in the length of the restraint belt 10 to fit vehicle occupants of various sizes and shapes.

Figure 2:
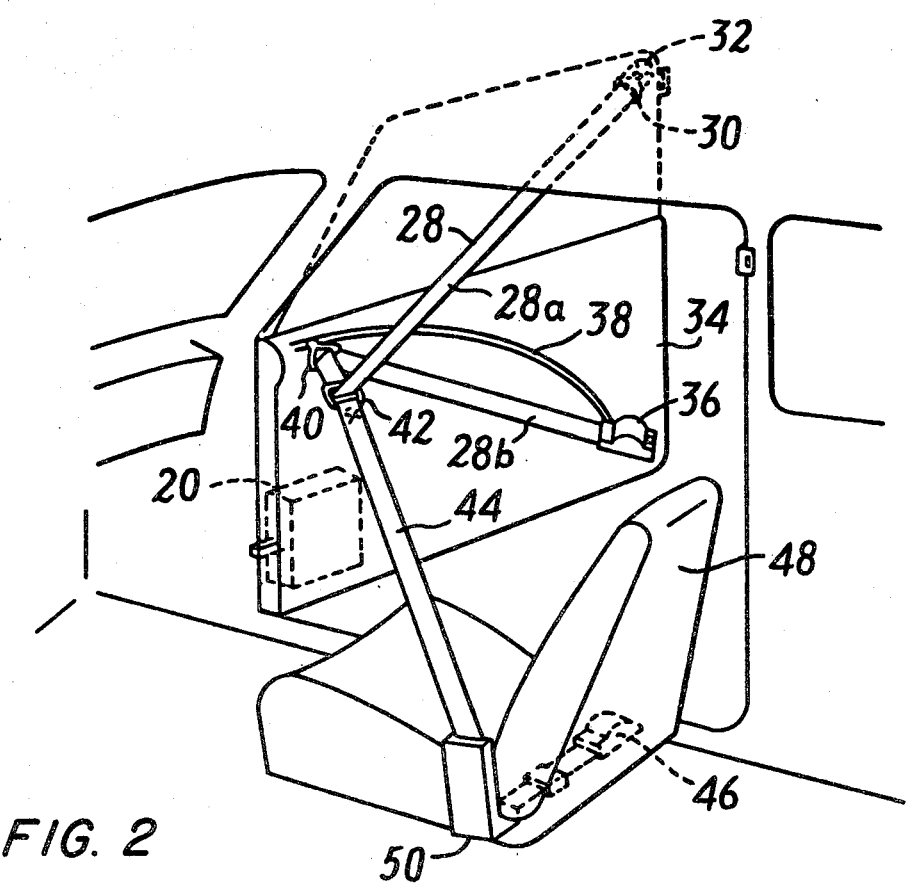
FIG. 2 is a generally schematic, pictorial view of another restraint system in which the present invention is useful.

Another example of a passive belt system in which the present invention can be used includes, as shown in FIG. 2, a continuous restraint belt 28 having one end attached by means of an emergency release buckle 30 to an anchor 32 affixed to the upper rear corner of the vehicle door 34. The other end of the restraint belt 28 leads from an emergency locking retractor 36 affixed adjacent the lower rear corner of the door 34. The belt 28 passes through a movable guide member 40 that slides along a guide rail 38 affixed to the vehicle door and then passes from the member 40 through a D-ring 42 that is affixed to the free end of a control belt 44. The control belt 44 leads from an emergency locking retractor 46 affixed under the vehicle seat 48 and passes through a combination force-responsive belt clamp and guide device 50 affixed adjacent the inboard lower rear portion of the seat 48.

The belt guide member 40 is moved along the guide rail 38 by a motor-driven, semi-flexible drive wire (not shown). The D-ring 42 subdivides the continuous restraint belt 28 into a shoulder belt portion 28a and a lap belt portion 28b. When the vehicle door is opened, the belt transfer system moves the belt guide member 40 to a release location at the upper forward end of the guide rail 38, and in the process shifts the restraint belt 28 into a release configuration in which it lies generally close to the inner surface of the door 34. Meanwhile, the control belt 44 is withdrawn from the retractor 46. When the vehicle door is closed, the transfer system moves the movable belt guide member 40 to a restraint location at the lower rear end of the guide rail 38 generally adjacent the retractor 36, thereby allowing the continuous belt 28 automatically to assume a restraint configuration in which the control belt 44 is pulled in by the retractor 46 such that the D-ring 42 lies adjacent the guide 50 at the inboard lower rear portion of the seat 48. In the restraining configuration, therefore, the shoulder belt portion 28a extends inwardly and downwardly from the anchor 32 across the vehicle occupant's torso, and the lap belt portion 28b extends inwardly from the retractor 36 across the occupant's lap. The retractor 46 provides a greater force on the control belt 44 than the force exerted on the restraint belt by the retractor 36, thus insuring that the belt is in the restraining configuration, but also providing by way of the retractor 36 adjustment in the length in the restraint belt 28 to fit vehicle occupants of various sizes and shapes.

Figure 3:
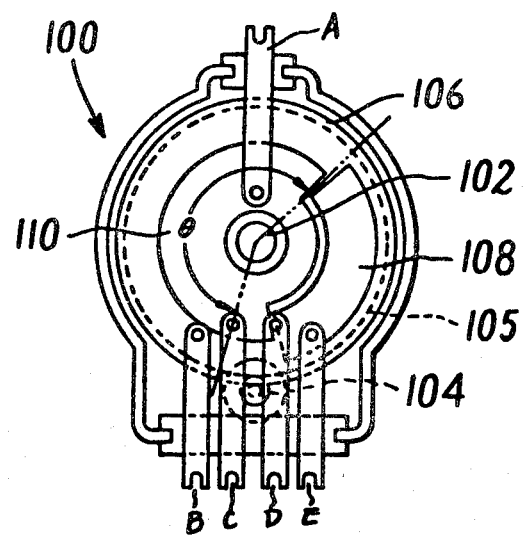
FIG. 3 is an elevational view of a rotary switch for controlling the motor of the transfer system.

The drive motor of a transfer system embodying the present invention is controlled, in part, by a rotary switch. As shown in FIG. 3, the rotary switch 100 is driven by the output shaft of the motor itself through reduction gears 104 and 105 that drive a shaft 102. The gears are designed so that the shaft 102 rotates through an angle $\theta$ when the belt guide member moves fully between the restraint position and the release position. For example, the angle in the illustrated design is 210°, but the specific angle $\theta$ is a matter of choice within the usual engineering parameters of electrical and mechanical design.

A cam 106 is coupled to the shaft 102 and has an essentially circular configuration. Two electrical conductors 108, 110 are attached to cam 106. The conductor 108, in the preferred embodiment, is a section of a circle comprising the area between two concentric circles. The conductor 110 has a generally circular shape, with a portion cut away. The cut away portion is generally an area bounded by inner and outer concentric circles, and has approximately the same shape as the conductor 108. In the illustrated embodiment, the conductor 108 has a width greater than the width of the portion of conductor 110 which has been cut away. The conductors 108 and 110 do not touch, so that there is no direct electrical contact between them.

Five stationary contacts A, B, C, D and E are positioned about the circumference of the cam 106 and lightly and resiliently touch the conductors 108 and 110 attached to the cam 106. The contact A is disposed so as to make continuous contact with the conductor 110. Contacts B and E are positioned to touch conductor 108 but not conductor 110. Contents C and D are positioned to touch both conductors 108 and 110.

In the position of the rotary switch shown in FIG. 3, contacts A and C are closed through conductor 110, and conductors D and E are closed through conductor 108. In the position shown in FIG. 4(a), contacts A, C and D are connected through conductor 110. In the position shown in FIG. 4(b), contacts A and D are closed by conductor 110, while contacts B and C are closed by conductor 108. The significance of these positions is described immediately below in conjunction with FIG. 5.

A circuit 200 includes a voltage source 202, such as the battery of a vehicle, one side of which is connected to ground. A fuse 204 is interposed between the power source 202 and the remainder of the circuit 200. The reversible DC motor 200 that drives the belt transfer system between the restraint and release positions in connected into the circuit for reversible operation by a double-pole, double-throw switch 206 that is transferred by the opening and closing of the vehicle door. The double-pole, double-throw switch 206 comprises a first single-pole, double-throw switch 208 which transfers to connect line 210 to line 212 or line 214. Correspondingly, the single-pole, double-throw switch 216 transfers to connect line 218 with line 220 or line 222. In the illustrated embodiment, the double-pole, double-throw switch 206 is in the upper position when the door of the vehicle is in the closed position; i.e., switch 208 connects line 210 with line 212, and switch 216 connects line 218 with line 220. When the door of the vehicle is opened, the double-pole, double-throw switch 206 transfers to the lower position, wherein the switch 208 connects line 210 to line 214 and the switch 216 connects line 218 to line 222.

Line 214 terminates in a contact C and a switch 224. Switch 224 transfers between contacts A and B to connect line 214 to lines 226 or 228. Line 228 is connected to line 230 and line 232, which is connected to fuse 204. Line 226 is connected to ground. The switch 224 is in the upper position, connecting contacts B and C, when the belt is in the release position. The switch 224 is in the lower position, connecting contacts A and C, in all other configurations of the seat belt.

Line 220 terminates in contact D and switch 234 which transfers between points A and E. The switch 234 connects line 220 to line 236 when the switch 234 is positioned between the contacts A and D. When switch 234 is in the lower position, contacts D and E are made to join line 220 to line 238. Line 238 is connected to line 230. The switch 234 transfers to the lower position, connecting contacts D and E, when the seat belt is in the restraint position. The switch 234 is in the upper position, connecting contacts A and D, in all other positions of the seat belt.

Figure 5:
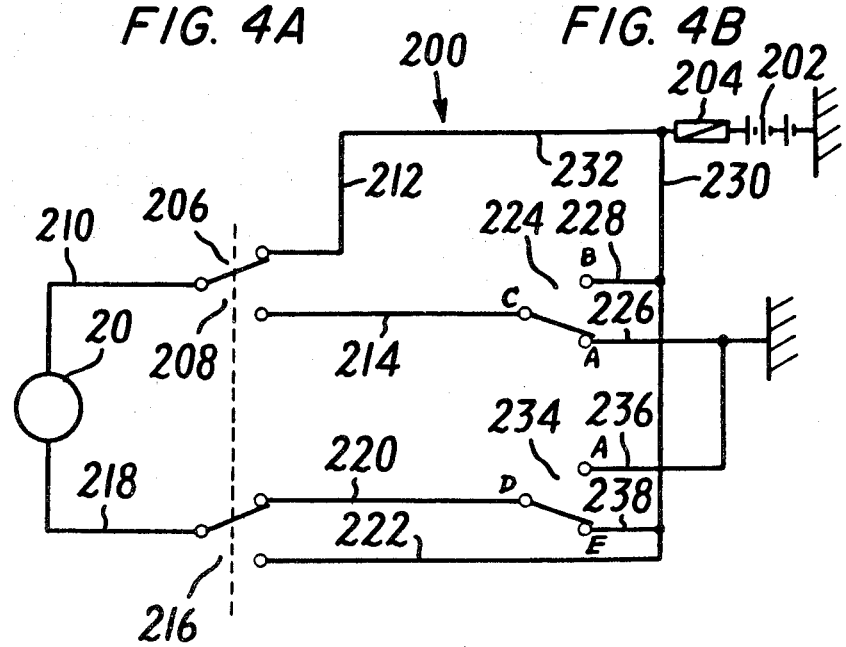
FIG. 5 is a schematic diagram of an electrical circuit that includes the switch shown in FIG. 3 and controls the belt transfer system.

The switches 224, 234 of FIG. 5 are schematic depictions of the embodiment of the switch of FIG. 3. Accordingly, the five contacts A to E positioned on the cam 106 of FIG. 3 correspond to the contacts A to E of the circuit 200 in FIG. 5. It will be understood that switches 224, 234 other than that illustrated in the embodiment of FIG. 3 may be used.

In the condition of the circuit shown in FIG. 5, the vehicle door is closed, and the seat belt is in the full restraint position. This is evident from the position of the double-pole, double-throw switch 206 in the upper position, indicating a door closed condition. The switch 234 is in the lower position, making contacts D and E, indicating that the seat belt is in the restraint position. In this configuration, no current flows through the circuit 200, as the circuit is not grounded.

When the door of the vehicle is opened, the double-pole, double-throw switch 206 is transferred from the upper contacts to the lower contacts. The switch 216 transfers to the lower position to connect line 218 to line 222, and switch 208 transfers to the lower position to connect line 210 to line 214. In this configuration, current flows from source 202 through lines 230, 222, and 218 to motor 20. The circuit is completed to ground through lines 210, 214 and 226. Motor 20 then rotates to extend the seat belt toward the release position. In this configuration, switch 224 is in the lower position, connecting contacts A and C.

As soon as the belt moves from the restraint position, switch 234 transfers to the upper position, connecting contacts A and D. When the belt reaches the release position, switch 224 transfers to the upper position between contacts B and C. When switch 224 no longer connects lines 214 to line 226, the circuit 200 is no longer grounded and current is no longer supplied to the motor 20. However, when switch 224 transfers to its upper position, connecting contacts B and C, the motor 20 is short circuited through lines 228 and 230. All electric motors generate voltage, called the counter emf, by the generator action in the parallel paths of the armature. This voltage is utilized as a brake to stop the rotation of the motor 20 by short-circuiting the motor 20. Thus, the motor 20 stops quickly as soon as the seat belt reaches the release position because of the electrical braking effect of the short-circuiting.

When an occupant enters the vehicle, the switches 224, 234 are in the upper positions. When the occupant closes the door, the double-pole, double-throw switch 206 transfers from the lower position to the upper position, switch 208 connects line 210 to line 212, and switch 216 connects line 218 to line 220. Current then flows from source 202 through lines 232, 212, 210 to motor 20 and returns to ground over lines 218, 220 and 236. In this configuration, the seat belt retracts from the release position to the restraint position.

When the seat belt reaches the restraint position, the switch 234 transfers from the upper position between contacts A and D and the lower position, between contacts D and E. This action breaks the circuit that provides current to motor 20 and short circuits the motor 20 through lines 218, 220, 238, and 230. As in the previous instance, this connection utilizes the counter emf of the motor 20 to brake the operation of the motor 20 so that it stops quickly.

In FIG. 5, switch 224 is in the upper position, between contacts B and C, only when the seat belt is in the release position. The switch 224 is in the lower position, between contacts A and C, whenever the seat belt is in any other position. The switch 234 is in the lower position, between contacts D and E, when the belt is in the restraint position. In all other positions of the seat belt, the switch 234 is in the upper position, between contacts A and D.

Figures 4A, 4B:
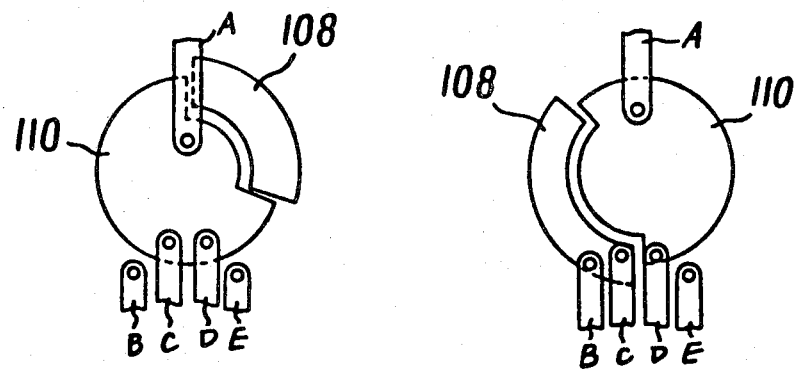
FIGS. 4(a) and 4(b) illustrate two of the operating modes of the rotary switch of FIG. 3.

In FIG. 3, the configuration of the conductors 108, 110 and the contacts A to E indicate that the seat belt is in the restraint position. In FIG. 4(b) the switch 100 indicates that the belt is between the release and restraint positions. In FIG. 4(b) the belt is in its release position.

While one embodiment of the present invention has been described herein and in the accompanying drawings, various modifications may be made without departing from the spirit and scope of the invention.

I claim:

1. A belt transfer system for transferring a belt guide member of a passive vehicle occupant restraint belt system between a restraint location in which the belt is adapted to engage the occupant and a release location in which the belt is adapted to release the occupant comprising a source of DC electrical power, a reversible DC motor, first circuit means including a first switch for connecting both sides of the motor armature to the power source to brake electrically the motor when the belt guide member reaches the release location at the end of transfer thereto, second circuit means including a second switch for connecting the motor across the power source to energize it for rotation in a direction to transfer the belt guide member from the restraint location to the release location, third circuit means including a third switch for connecting both sides of the motor armature to the power source to brake electrically the motor when the belt transfer member reaches the restraint location at the end of transfer thereto, fourth circuit means including a fourth switch for connecting the motor across the power source to energize it for rotation in a direction to transfer the belt guide member from the release location to the restraint location, and a double-pole, double-throw switch actuated in response to the position of the vehicle door for connecting the first and second switches to the motor when the door is opened and the third and fourth switches to the motor when said door is closed.

2. A belt transfer system according to claim 1, wherein said switches are transferred in response to the rotational position of a switching member coupled to the motor for rotation of less than 360° during rotation of the motor corresponding to full movement of said belt transfer member between the release and restraint locations.

3. A belt transfer system according to claim 2, wherein each switch includes a pair of fixed contacts and the switching member includes a pair of rotary conductive contacts for selectively connecting the fixed contacts.

4. A belt transfer system according to claim 3, wherein the switching member is a rotary cam having surfaces for selectively transferring the switches.

* * * * *